(12) United States Patent
Savolainen et al.

(10) Patent No.: US 10,652,347 B2
(45) Date of Patent: May 12, 2020

(54) ACCESS TO DATA SOURCE VIA PROXY

(71) Applicant: Nokia Technologies Oy, Espoo (FI)

(72) Inventors: Teemu Savolainen, Nokia (FI);
Bilhanan Silverajan, Kangasala (FI)

(73) Assignee: Nokia Corporation, Espoo (FI)

( * ) Notice: Subject to any disclaimer, the term of this patent is extended or adjusted under 35 U.S.C. 154(b) by 560 days.

(21) Appl. No.: 14/891,970

(22) PCT Filed: May 20, 2013

(86) PCT No.: PCT/FI2013/050540
§ 371 (c)(1),
(2) Date: Nov. 18, 2015

(87) PCT Pub. No.: WO2014/188049
PCT Pub. Date: Nov. 27, 2014

(65) Prior Publication Data
US 2016/0094673 A1 Mar. 31, 2016

(51) Int. Cl.
*H04L 29/08* (2006.01)
*H04L 29/06* (2006.01)

(52) U.S. Cl.
CPC ............. *H04L 67/28* (2013.01); *H04L 63/10* (2013.01); *H04L 67/02* (2013.01); *H04L 67/12* (2013.01)

(58) Field of Classification Search
CPC .......... H04L 51/14; H04L 45/00; H04L 45/24

USPC ......................................................... 709/202
See application file for complete search history.

(56) References Cited

U.S. PATENT DOCUMENTS

| | | | |
|---|---|---|---|
| 2003/0217126 A1* | 11/2003 | Polcha | G06F 9/44505 709/220 |
| 2006/0112171 A1* | 5/2006 | Rader | H04L 63/102 709/218 |
| 2014/0047322 A1* | 2/2014 | Kim | G06F 17/2247 715/234 |

FOREIGN PATENT DOCUMENTS

| | | |
|---|---|---|
| CN | 1829153 A | 9/2006 |
| CN | 102281251 A | 12/2011 |
| CN | 102316606 A | 1/2012 |
| CN | 102652445 A | 8/2012 |

* cited by examiner

*Primary Examiner* — Tauqir Hussain
(74) *Attorney, Agent, or Firm* — Laine IP Oy

(57) ABSTRACT

In accordance with an example embodiment of the present invention, there is provided an apparatus, comprising at least one processor configured to execute a computer executable program stored in a memory comprised in the apparatus, wherein the computer executable program thereby causes the apparatus to at least open a first connection to a data source device, open a second connection to a proxy device, the second connection employing a first protocol and a cross origin resource sharing context, and receive from the proxy device information of the data source device.

23 Claims, 5 Drawing Sheets

ACCESS TO DATA SOURCE VIA PROXY

TECHNICAL FIELD

The present application relates generally to connectivity between objects using communication protocols.

BACKGROUND

Communication-enabled devices may exchange messages using various protocols. For example, a desktop or laptop computer may access the Internet using hypertext transport protocol, HTTP, run over internet protocol, IP. An end station, such as a computer or a smartphone, for example, may receive real time media content over real time transport, RTP, protocol. Protocols may be employed as a protocol stack which comprises protocols with distinct features used together. When a data stream encoded using a protocol stack is transmitted in a network, a payload portion of a first protocol data unit may comprise a protocol data unit of a second protocol, the payload portion of the protocol data unit of the second protocol in turn comprising a protocol data unit of a third protocol.

The constrained application protocol, CoAP, is a software protocol that may be employed in communication involving as at least one party a node with limited resources, such as power, processing capability or memory. CoAP allows for interactive communication with such nodes to enable them to interact with further nodes via network connections.

Networks employing CoAP may include sensor networks, for example, wherein sensor nodes may be simple, resource-constrained devices enabled to perform measurements of physical properties, or capture media such as sound. In a sensor network the sensor nodes may periodically provide measurement results they have produced, or they may be configured to provide a measurement result to a querying node responsive to a request. Such a request may be conveyed using CoAP, for example.

In networking a same-origin policy is a security concept that may be employed in browser-side programming languages, such as javascript. The policy permits executable elements originating from a network site to use each other's resources and parts. The policy may be configured to restrict use of resources and/or parts of executable elements originating from a different site.

SUMMARY

Various aspects of examples of the invention are set out in the claims.

According to a first aspect of the present invention, there is provided an apparatus, comprising at least one processor configured to execute a computer executable program stored in a memory comprised in the apparatus, wherein the computer executable program thereby causes the apparatus to at least open a first connection to a data source device, open a second connection to a proxy device, the second connection employing a first protocol and a cross origin resource sharing context, and receive from the proxy device information of the data source device.

According to a second aspect of the present invention, there is provided a method, comprising causing opening of a first connection to a data source device, causing opening of a second connection to a proxy device, the second connection employing a first protocol and a cross origin resource sharing context, and receiving from the proxy device information of the data source device According to a third aspect of the present invention, there is provided an apparatus, comprising at least one processor, at least one memory including computer program code the at least one memory and the computer program code configured to, with the at least one processor, cause the apparatus to at least receive a first message from a data source device, and receive a second message from a node, the second message comprising an indication of a source of a computer executable program running in the node.

According to a fourth aspect of the present invention, there is provided a method, comprising receiving a first message from a data source device, and receiving a second message from a node, the second message comprising an indication of a source of a computer executable program running in the node.

According to further aspects of the present invention, there are provided computer programs configured to cause methods in accordance with the second and fourth aspects to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

In networking involving resource-constrained nodes, the invented communication method may enable proxying content from smart objects in a flexible way that doesn't violate a same origin security policy. Executable code may be received from a network, for example to a browser, to access and proxy the content in a secured way. An example is a trusted web application which can access resource-constrained peripheral devices via a proxy device to locally proxy the content.

Figure 1A:
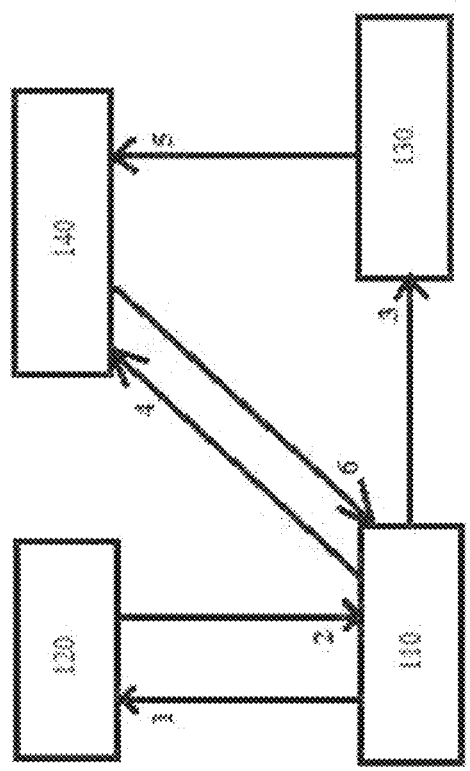
FIG. 1A illustrates a first example system capable of supporting at least some embodiments of the invention.

FIG. 1A illustrates a first example system capable of supporting at least some embodiments of the invention. Illustrated in FIG. 1A is browser 110, which may comprise, for example, a web browser such as a HTTP browser operating on a computing device, such as a personal computer, smartphone or tablet device. Network site 120 may comprise, for example, a world wide web, WWW, site accessible to browser 110. Smart device 130 may comprise, for example, a sensor such as a sensor that is capable of measuring a physical property such as temperature, moisture, presence of smoke, humidity, speed or noise level. A sensor may comprise alternatively an actuator, such as a window opener, or a camera device, for example. Proxy device 140 may comprise, for example, a HTTP/CoAP proxy. Proxy device 140 may be disposed in a network location such as the Internet, or in a home network, for example. In some embodiments, smart device 130 and proxy device 140 are located in the same home environment but in other embodiments this is not the case.

Browser 110 may interface toward network site 120 via a wire-line or at least in part wireless interface. When browser 110 is run on a device with cellular connectivity, the interface from browser 110 to network site 120 may comprise, in part, a cellular interface such as a long term evolution, LTE, or wideband code division multiple access, WCDMA, interface, for example. Browser 110 may interface toward smart device 130 via an interface which may comprise, for example, a near-field communication, NFC, interface, a wireless local area network, WLAN, interface, or a low-power radio interface such as Bluetooth, for example. Browser 110 may use an interface comprised in a device running browser 110. Smart device 130 may interface toward proxy device 140 via a wired or at least in part wireless interface, such as Ethernet, WLAN, a cellular interface or Bluetooth, for example. Browser 110 may interface toward proxy device 140 via a wired or at least in part wireless interface. In some embodiments, browser 110, smart device 130 and proxy device 140 are comprised in the same local-area network, wherein the local-area network may comprise a WLAN network.

The numbered arrows in FIG. 1A illustrate signaling. Arrow 1 denotes browser 110 contacting network site 120 to request information, for example to request a web page. Arrow 2 denotes network site 120 responsively providing at least the requested information, for example the web page. The provided information may comprise a computer executable program, such as for example a script program or an executable file. The program may be configured to act toward smart device 130 to mirror or cache data contained therein, to allow smart device 130 to be in a sleep or energy-saving mode for longer periods of time uninterrupted, for example.

To enable such caching, browser 110 may contact smart device 130 and provide a credential of itself, or at least an identity or address of itself, to smart device 130. This is illustrated in FIG. 1A as arrow 3. Browser 110 may provide an address of proxy device 140 to smart device 130 over the interface interconnecting browser 110 and smart device 130. In some embodiments, browser 110 is configured to obtain at least one of an address and an identity of proxy device 140 from smart device 130, in case smart device 130 is configured with at least one of an address and identity of proxy device 140. As a result of the interaction illustrated by arrow 3, a trust relationship may be established between browser 110 and smart device 130. Arrow 3, while illustrated as one-way, may comprise two-way communication between browser 110 and smart device 130.

In a communication illustrated by arrow 4, browser 110 may request proxy device 140 to proxy content from smart device 130, for example in browser 110. In the communication illustrated by arrow 4, browser 110 may indicate network site 120 as an origin of the computer executable program. In this communication, browser 110 may employ cross-origin resource sharing, CORS. In this communication, browser 110 may provide credentials of at least one of itself and smart object 130. A credential of browser 110 may in this aspect comprise, for example, a credential of a device running browser 110, or a credential of the computer executable program obtained in browser 110 in the phase illustrated by arrow 2. Thus, proxy device 140 is enabled to decide whether to accept a communication from network site 120 despite the fact that the communication illustrated as arrow 3 physically originates from browser 110. Browser 110 may be configured to prevent computer executable programs from network site 120 from accessing proxy device 140 unless network site 120 is indicated as the origin. Credentials provided by browser 110 may enable proxy device 140 to decide to co-operate with browsers 110 only if they've been in contact with smart device 130 previously.

In a communication illustrated as arrow 5, smart device 130 may send to proxy device 140 a message, such as for example a CoAP message, to register itself to proxy device 140. In this communication, smart device 130 may provide credentials of at least one of itself and browser 110. A credential of browser 110 may in this aspect comprise, for example, a credential of a device running browser 110, or a credential of the computer executable program obtained in browser 110 in the phase illustrated by arrow 2. The chronological order of the communications illustrated by arrows 4 and 5 may vary depending on the embodiment.

In a communication illustrated as arrow 6, proxy device 140 may forward the message received in proxy device 140 from smart device 130 to browser 110 to initiate content proxying. The message may be forwarded in a different form, for example if the message from smart device 130 was a CoAP message, such as for example a CoAP PUT, GET, POST or DELETE, proxy device 140 may translate it into HTTP format before forwarding it to browser 110. Proxy device 140 in effect establishes a web storage relationship, which may be either local or session storage. A session storage may comprise that data is stored for a duration of a browser tab, wherein when the browser tab is closed, the data stored in the session storage is deleted. Browser 110 may store each received content item of smart device 130 in browser 110, for example as a name/value pair. In this sense, nodes on the Internet, for example, may obtain access to content items of smart device 130 by requesting them from browser 110. Alternatively or additionally, other applications running in browser 110, or in a device running browser 110, may access the content items of smart device 130. In some embodiments, multiple browsers 110 running on multiple nodes may access the content items of smart device 130 from proxy device 140. In general, browser 110 may be directed by the computer executable program obtained in the phase illustrated by arrow 2 to perform its part in actions illustrated by arrows 3, 4 and 6. In general, browser 110 may perform a similar sequence with respect to more than one smart device, to proxy at least partly content from each.

Figure 1B:
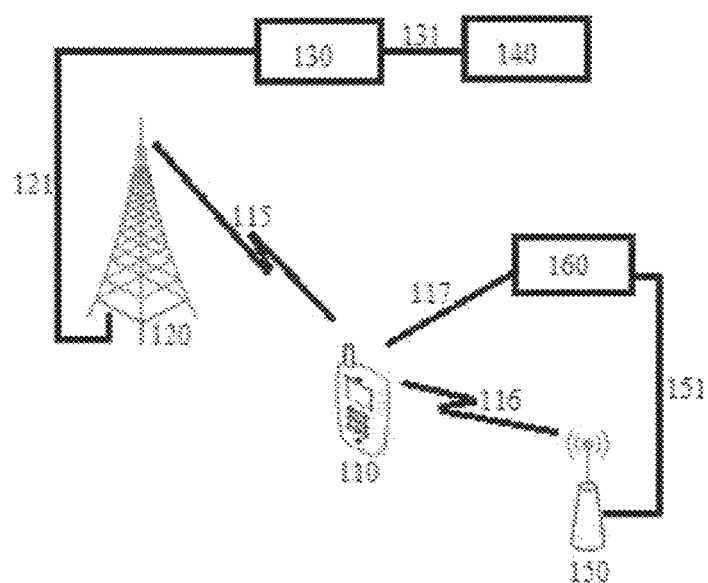
FIG. 1B illustrates a second example system capable of supporting at least some embodiments of the invention.

FIG. 1B illustrates a second example system capable of supporting at least some embodiments of the invention. The functioning of the system of FIG. 1B is similar to that of the system of FIG. 1A. In detail, mobile 110 or FIG. 1B may run browser 110 of FIG. 1A. Running in this context may comprise that executable code of the browser is stored in a memory of mobile 110, and a processor of mobile 110 is executing the executable code of the browser. Likewise sensor unit 150 of FIG. 1B may function as smart device 130 of FIG. 1A, and proxy 160 of FIG. 1B may function as proxy device 140 of FIG. 1A. In the embodiment of FIG. 1B, mobile 110 may be connected, for example continuously connected, to the Internet via wireless link 115, base station 120, connection 121, core network node 130, connection 131 and gateway 140. Mobile 110 may communicate with sensor unit 150 via Bluetooth, for example, and with proxy 160 via WLAN or via a wire-line connection, for example. Connection 151 between sensor unit 150 and proxy 160 may be a wire-line connection, or alternatively at least in part a wireless connection. The system of FIG. 1B is illustrative of only one example system, to which the invention is not restricted to.

In general there is provided a first apparatus, such as for example an apparatus capable of running browser 110. The first apparatus may be configured, by a computer executable program stored in a memory comprised in the apparatus, to at least open a first connection to a data source device, open a second connection to a proxy device, the second connection employing a first protocol and a cross origin resource sharing context, and to receive from the proxy device information of the data source device. The data source device may comprise, for example, a device such as smart device 130 of FIG. 1A or sensor unit 150 of FIG. 1B. The first connection may be arranged to establish a trust relationship between a browser and the data source device. Establishing a trust relationship may comprise transmitting and/or receiving at least one credential. The first apparatus may be configured to transmit and/or receive at least one credential over the second connection. The at least one credential communicated over the second connection may comprise at least one of a credential of the first apparatus and a credential of a browser running on the first apparatus. Information of the data source device may comprise measurement data or status information, for example.

In some embodiments, the first apparatus is further caused to receive information comprising the computer executable program. The computer executable program may comprise, at least in part, an executable script embedded in a web page the first apparatus is enabled to access. In some embodiments, the first protocol comprises a hypertext transport protocol, such as HTTP. Examples of executable script types include javascript, jscript, Ejscript, ActionScript, ECMAscript and Jscript.NET.

In some embodiments, the first connection comprises at least one of a NFC, WLAN and low-power radio connection. A low-power radio connection may comprise a Bluetooth or Bluetooth low energy connection, for example.

In some embodiments, the first apparatus is caused to indicate over the second connection an address of the web page. The address of the web page may be indicated as an origin of a computer executable program executed by the first apparatus.

In general there is provided a second apparatus, such as for example a proxy device 140. The second apparatus comprises at least one processor, at least one memory including computer program code, the at least one memory and the computer program being code configured to, with the at least one processor, cause the apparatus to at least receive a first message from a data source device. The first message may comprise a registration of the data source device, or more generally the first message may be configured to cause the second apparatus to initialize a state for the data source device in the second apparatus. The second apparatus may also be caused to receive a second message from a node, the second message comprising an indication of a source of a computer executable program running in the node. The indication of the source of the computer executable program may comprise an indication of source of the second message. The first message may comprise a request to start mirroring data of the data source device. The first message may enable the second apparatus to associate the data source device with a node.

In some embodiments, the first message comprises a constrained application protocol, CoAP, registration request. The first message may comprise a credential of the data source device and/or a credential of a web application, such as for example an application transmitting the second message. Thus a web application may comprise an executable script, such as a javascript program, as described above.

In some embodiments, the second message may use a cross origin resource sharing mechanism. The second message may comprise a credential of at least one of a web application running on the node, the node and the data source device. In case the second apparatus receives a credential of the web application from both the first message and the second message, and the credentials from the first and second messages do not match, the second apparatus may be configured to refuse to provide data of the data source device to the node. Likewise if credentials of the node from the first and second messages do not match, the second apparatus may be configured to refuse to provide data of the data source device to the node.

In some embodiments, the second apparatus is further caused to assign storage space for resource data of the data source device. In some embodiments, this comprises requesting storage space to be assigned in the node.

Figure 3:
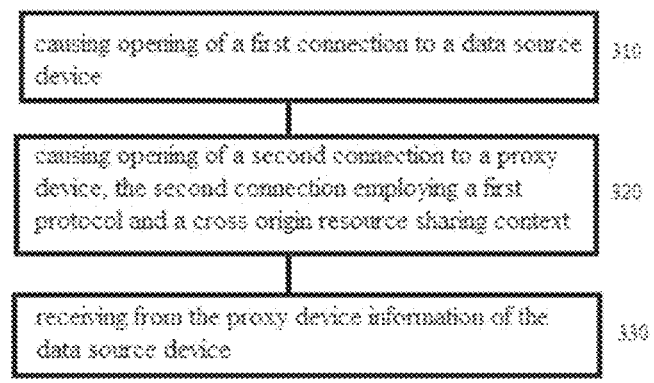
FIG. 3 is a first flowgraph illustrating phases of an example method in accordance with at least some embodiments of the invention.

FIG. 3 is a first flowgraph illustrating phases of an example method in accordance with at least some embodiments of the invention. The phases of the illustrated method may be performed in browser 110, for example. The phases of the illustrated method may be caused to be performed by a script program running in browser 110, for example. Phase 310 comprises causing opening of a first connection to a data source device. Phase 320 comprises causing opening of a second connection to a proxy device, the second connection employing a first protocol and a cross origin resource sharing context. Finally phase 330 comprises receiving from the proxy device information of the data source device.

Figure 2:
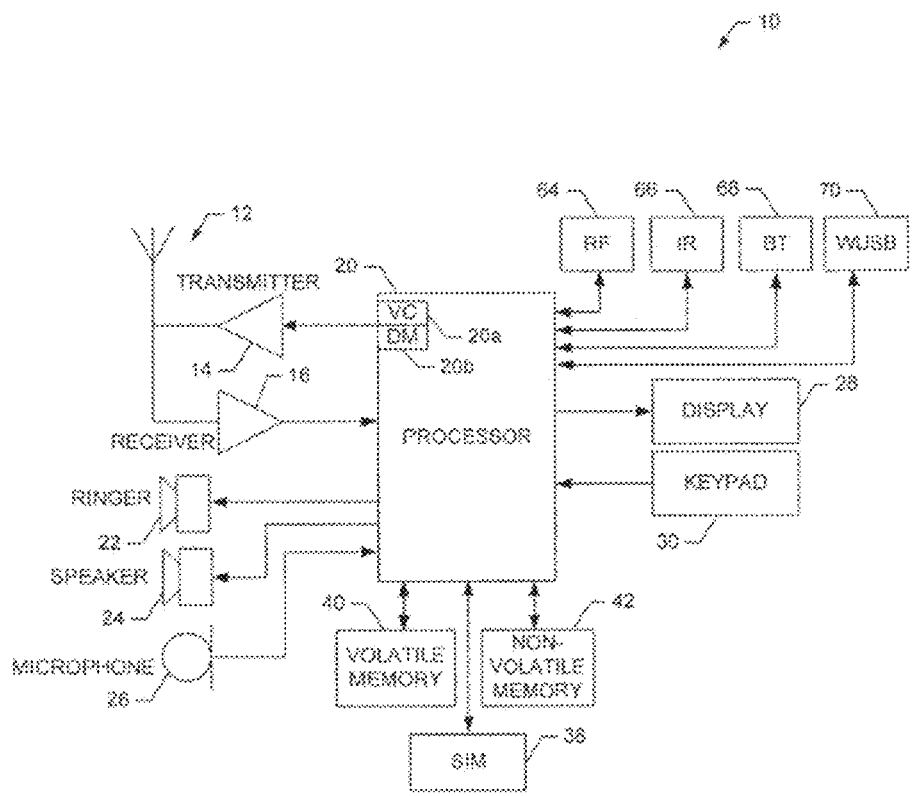
FIG. 2 illustrates a block diagram of an apparatus in accordance with an example embodiment of the invention.
Figure 4:
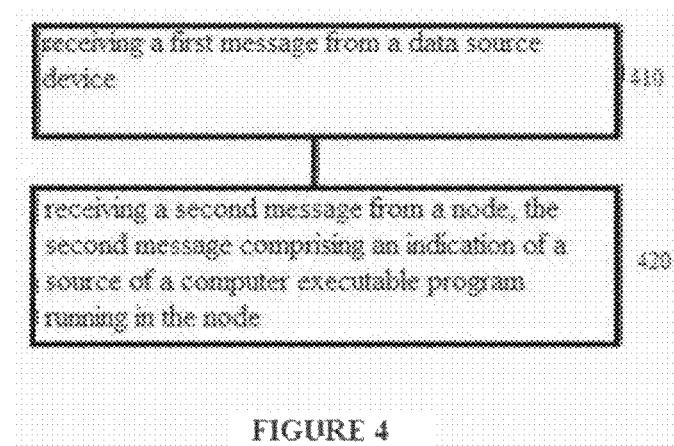
FIG. 4 is a second flowgraph illustrating phases of an example method in accordance with at least some embodiments of the invention.

FIG. 4 is a second flowgraph illustrating phases of an example method in accordance with at least some embodiments of the invention. The phases of the illustrated method may be performed in proxy device 140, for example. Phase 410 comprises receiving a first message from a data source device. Phase 420 comprises receiving a second message from a node, the second message comprising an indication of a source of a computer executable program running in the node FIG. 2 illustrates a block diagram of an apparatus 10 such as, for example, a mobile terminal, in accordance with an example embodiment of the invention. The illustrated mobile terminal may be arranged to run browser 110, for example. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s)

without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analogue or TDMA/CDMA/analogue phones.

Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analogue-to-digital converter, a digital-to-analogue converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™' BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

While FIG. 2 is described above primarily in the context of a mobile device, certain of the components discussed, such as memories, processors and transceivers, can be employed to implement a network-side device.

Without in any way limiting the scope, interpretation, or application of the claims appearing below, a technical effect of one or more of the example embodiments disclosed herein is that smart devices may be enabled to remain in a sleep mode for longer times. Another technical effect of one or more of the example embodiments disclosed herein is that access to data of smart devices is improved. Another technical effect of one or more of the example embodiments disclosed herein is that access to data of smart devices is rendered more reliable.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor configured to execute software stored in a memory comprised in the apparatus, wherein the software thereby causes the apparatus to at least:
retrieve, from a network site, a computer executable program comprising a script program or an executable file;
open a first connection to a data source device distinct from the network site;
open, using the computer executable program, a second connection to a proxy device distinct from the network site and the data source device to request the proxy device to proxy content from the data source device, the second connection employing a first communication protocol and indicating the network site as a source of the computer executable program, and
receive from the proxy device information of the data source device;
wherein the apparatus is configured to establish trust and communicate an identifier of the proxy device over the first connection.

2. The apparatus according to claim 1, wherein the apparatus is configured to employ cross origin resource sharing, CORS, in the second connection.

3. The apparatus according to claim 2, wherein the software comprises an executable script embedded in a web page.

4. The apparatus according to claim 1, wherein the first communication protocol comprises a hypertext transport protocol.

5. The apparatus according to claim 1, wherein the first connection comprises at least one of a near-field communications connection, a wireless local area network connection and a low-power radio connection.

6. The apparatus according to claim 3, wherein the apparatus is caused to indicate over the second connection an address of the web page.

7. A method, comprising:
retrieving, from a network site, a computer executable program comprising a script program or an executable file;
causing opening of a first connection to a data source device distinct from the network site;
causing opening, using the computer executable program, of a second connection to a proxy device distinct from the network site and the data source device to request the proxy device to proxy content from the data source device, the second connection employing a first communication protocol and indicating the network site as a source of the computer executable program,
receiving from the proxy device information of the data source device; and establishing trust and communicating an identifier of the proxy device over the first connection.

8. The method according to claim 7, wherein the first communication protocol comprises a hypertext transport protocol.

9. The method according to claim 7, wherein the first connection comprises at least one of a near-field communications connection, a wireless local area network connection and a low-power radio connection.

10. An apparatus, comprising:
    at least one processor; and
    at least one memory including computer program code, the at least one memory and the computer program code configured to, with the at least one processor, cause a proxy apparatus to perform at least the following:
        receive a first message from a data source device comprising credentials of at least one of the data source device and a node,
        receive a second message from the node, distinct from the data source device, the second message comprising an indication of a source of a computer executable program running in the node, the source distinct from the node and the data source device, the computer executable program comprising a script program or an executable file, and
        transmit an identifier of the proxy device to the data source device.

11. The apparatus according to claim 10, wherein the first message comprises a constrained application protocol registration request.

12. The apparatus according to claim 10, wherein the first message comprises a credential of the data source device.

13. The apparatus according to claim 10, wherein the first message comprises a credential of a web application.

14. The apparatus according to claim 10, wherein the second message uses a cross origin resource sharing mechanism.

15. The apparatus according to claim 10, wherein the second message comprises credentials of at least one of the node and the data source device.

16. The apparatus according to claim 10, wherein the apparatus is further caused to assign storage space for resource data of the data source device.

17. The apparatus according to claim 10, wherein the first message comprises a request requesting initialization of a state of the data source device in the apparatus.

18. A method in a proxy device, comprising:
    receiving a first message from a data source device, comprising credentials of at least one of the data source device and a node, the node distinct from the data source device;
    receiving a second message from the node, the second message comprising an indication of a source of a computer executable program running in the node, the source distinct from the node and the data source device, the computer executable program comprising a script program or an executable file, and
    transmitting to the node information of the data source device, and.

19. The method according to claim 18, wherein the first message comprises a constrained application protocol registration request.

20. The method according to claim 18, wherein the first message comprises a credential of the data source device.

21. The method according to claim 18, wherein the first message comprises a credential of a web application.

22. The method according to claim 18, wherein the second message uses a cross origin resource sharing, CORS, mechanism.

23. The method according to claim 18, wherein the second message comprises credentials of at least one of the node and the data source device.

* * * * *